United States Patent Office 3,216,785
Patented Nov. 9, 1965

3,216,785
PROCESS FOR THE PURIFICATION OF HALOGENATED VOLATILE COMPOUNDS OF GERMANIUM AND SILICON
Roland Gauguin, Neuilly-sur-Seine, and Georges Nury, Montmorency, France, assignors to Pechiney, Compagnie de Produits Chimiques et Electrometallurgiques, Paris, France, a corporation of France
No Drawing. Filed Mar. 6, 1961, Ser. No. 93,347
Claims priority, application France, Mar. 11, 1960, 821,033
9 Claims. (Cl. 23—14)

The present invention, which results from applicants' researches, relates to a process for removing phosphorous impurities which may be contained in volatile liquid halogenated, e.g. chlorinated compounds of germanium or silicon: $SiCl_4$, $GeCl_4$, $SiHCl_3$, $GeHCl_3$, $SiH_2Cl_2$, $SiBr_4$, $SiHBr_3$.

It is already known to remove from these volatile compounds elements such as boron, aluminum, gallium, titanium, indium, thallium, vanadium and antimony, by the addition of triphenylmethyl chloride, but this process has no effect on the phosphorous impurities which, most often, consist of phosphorous trichloride or phosphorous hydride. Even when present in very small quantities, phosphorous represents a very objectionable impurity in the production of semi-conductors, and the removal of phosphorous from the finished metalloid by the zone fusion process is very expensive.

It has been suggested to remove phosphorous by forming a solid addition compound with aluminum trichloride after the phosphorous has been totally oxidized by means of chlorine. Unfortunately, aluminum trichloride is a solid compound, only slightly soluble in liquid chlorinated derivatives of silicon or germanium. Further, aluminum chloride is difficult to produce and preserve (store) in the pure state because it reacts very readily with atmospheric water vapor. It must be finely ground in a dry atmosphere at the time of use in order to facilitate its solution and to provide fresh surfaces, free of hydrolysis. Moreover, it is not advisable to add an element such as aluminum, which is as troublesome as boron and phosphorous in semi-conductors.

The process which is the object of the present invention avoids all these difficulties by uisng as the precipitating agent for phosphorous tin tetrachloride, a liquid compound which dissolves completely in the liquids to be treated. Titanium tetrachloride can also be used, but the resultant compound is more soluble than that formed with tin tetrachloride. By simple distillation, stannic chloride (as well as titanium tetrachloride) is obtained in an absolutely pure state and can be kept without being subjected to alteration. Tin and titanium tetrachloride form with the pentahalides of phosphorous, solid and non-volatile compounds of the $PX_5 \cdot MCl_4$ type, X representing 5 atoms of halogens which can be of the same or different members of the halogen group, while M designates the metal of the precipitating chloride.

Formation of the addition compound is achieved by simple contact, at room temperature, of the pentahalides of phosphorous with the tin tetrachloride (or titanium tetrachloride) in the liquid to be treated.

The process of the invention enables practically total removal of phosphorous. It can be applied directly to the crude halogenated or hydrohalogenated derivatives of germanium or silicon obtained, for example, by reacting hydrochloric acid with the metalloid in the presence of copper powder.

The removal of phosphorous according to the process of the present invention comprises: oxidation of the phosphorous impurities into phosphorous pentahalide, formation of a non-volatile addition compound of the pentahalide with tin or titanium tetrachloride, separation of the addition compound and, eventually, separation of the tin or titanium compounds entrained in the treated liquid.

After having determined, at least approximately, the phosphorous content of the product to be treated, the stannic (or titanic) chloride is added.

The stannic (or titanic) chloride dissolves immediately in the liquid to be treated; according to a feature of the invention, the amount of stannic (or titanic) chloride to be added should distinctly exceed the quantity theoretically required to form the addition product, $PX_5 \cdot MCl_4$. An amount of the order of ten times the theoretical quantity is useful for insuring complete reaction at room temperature, but it is possible to introduce, without inconvenience, much larger quantities, up to a thousand times the theoretical quantity, especially, when the quantity of phosphorous to be removed is very small.

Thereafter (or simultaneously) all of the phosphorous is brought to its maximum degree of oxidation by the action of a halogen. Chlorine can be used, but applicants have established that it is much more practical to use bromine which presents the advantage of being a liquid, of being completely soluble and easy to produce in a very pure state; it reacts rapidly and completely in the cold with the phosphorous compounds, phosphorous hydride being transformed into pentabromide, while phosphorous trichloride is transformed into trichloro-dibromophosphorous. Stirring is not necessary after the medium has been rendered homogeneous. It is sufficient to add the theoretical quantity of bromine, but due to the inaccuracy attending the determination of traces of phosphorous, it is preferable to add a larger quantity which can, without any drawback, amount to a thousand times the theoretical quantity. The excess halogen does not interfere with the subsequent preparation of the metalloid (it being completely eliminated in the course of that preparation) and, moreover, it can easily be preliminarily removed by distillation.

The reaction is permitted to take place at room temperature for at least two hours following the addition of both reagents; the reaction is the more complete the longer the time, but there is no advantage in prolonging the reaction more than 24 hours. The formed addition compounds ($SnCl_4 \cdot PX_5$ or $TiCl_4 \cdot PX_5$) melt above 150° C., are non-volatile and are heat stable. Therefore, they are easily separated by distilling off, almost to dryness, the volatile compounds of germanium or silicon. It would also be possible, without departing from the scope of the invention, to sepaarte the precipitate by filtration or decantation. However, distillation is the preferred separation procedure, because it is more easily carried out in the absence of air and moisture, and because it removes almost all of the excess tin (or titanium) tetrachloride, the boiling point of which is distinctly above that of the treated liquids.

Nevertheless, it may happen that the separation is not complete and, particularly, that there remain traces of tin or titanium, which may be troublesome under certain circumstances. Applicants have established that the tin salt (or titanium salt) can be completely removed by the action of triphenylmethyl chloride with which it forms an insoluble addition compound. Hence, there is added to the distillate a large excess of triphenylmethyl chloride which induces precipitation of the tin (or titanium) salt. Simultaneously, boron, aluminum, vanadium, antimony, etc. are removed by an already known precipitation process; the precipitate and the excess of triphenylmethyl chloride are completely removed by a second rectification.

The following examples are intended to illustrate the invention, but the latter is not limited to the specific cases given. The examples relates to the purification of trichlorosilane, but since the treated liquid solely plays the part of a solvent, the processes described in the examples can be applied without modification to other halogenated liquid compounds of silicon and germanium.

The first examples relate to the removal of phosphorous impurities, designedly added in quantities much higher than those encountered in practice, and are intended to demonstrate the effectiveness of the purification process.

Example I

Phosphorous trichloride is dissolved in pure trichlorosilane so as to have 100 parts phosphorous per million parts trichlorosilane. To this solution there are added at room temperature 17,000 parts stannic chloride, that is 20 times more than the theoretical quantity required to obtain $PCl_3 \cdot SnCl_4$. Immediately afterwards, there are added to the mixture 800 parts bromine instead of the 516 parts theoretically required for oxidizing phosphorous to $PCl_3Br_2$, and the mixture is shaken rapidly in order to render it homogeneous, whereupon it is allowed to rest for 3 hours at room temperature. The red solution becomes colorless, and the addition compound preciptates as a white powder which settles rapidly.

Thereafter, without separating the precipitate, distillation is carried out almost to dryness at normal pressure. Analysis carried out on 10 cc. distillate did not detect any phosphorous. The determination method which was used has a sensitivity limit of $5 \times 10^{-6}$ g. phosphorous. The phosphorous content of the product after treatment is thus below $5 \times 10^{-4}$ g./litre.

By way of comparison, there was carried out under the same conditions distillation of trichlorosilane contaminated with phosphorous trichloride (1) Without any treatment;
(2) After treatment with bromine, but without adding a tin salt.

In the first case, there were found in the distillate 40 parts phosphorous per million ($5.4 \times 10^{-2}$ g./litre) and, in the second case, 20 parts per million ($2.7 \times 10^{-2}$ g./litre).

Example II

To trichlorosilane contaminated with prosphorous trichloride (100 parts phosphorous per million parts trichlorosilane), there are added 17,000 parts stannic chloride, which corresponds to 20 times the theoretical quantity. Excess chlorine is bubbled into the mixture at room temperature to oxidize $PCl_3$ to $PCl_5$. There is observed the formation of a precipitate which settles down.

After resting for 4 hours at room temperature, distillation is carried out almost to dryness under the same conditions as in Example I. Determination (analysis) carried out on 10 cc. distillate did not disclose any phosphorous.

Example III

To the same solution of phorphorous in trichlorosilane as in Examples I and II, there are added 12,000 parts titanium tetrachloride (that is, 20 times the theoretical quantity required for the formation of $PCl_3 \cdot TiCl_4$). 1000 parts bromine are added (that is, about 2 times the quantity required for $PCl_3Br_2$). Homogenization is brought about by agitation. After resting for 4 hours distillation is carried out, almost to dryness, under the same conditions as in Examples I and II.

Phosphorous is not detected in an analysis made on 10 cc. distillate.

Example IV

The substance to be treated is crude trichlorosilane obtained by reacting at about 250° C. gaseous hydrochloric acid with a silicon-copper alloy containing 5% copper, followed by condensing the reaction gases at −30° C. The crude liquid comprises approximately 85% trichlorosilane and 15% silicon tetrachloride. It also contains a small quantity of dichlorosilane. Analysis shows its phosphorous content to be 0.5 part per million ($7.10^{-4}$ g. phosphorous per litre).

To one ton of product, there are added 500 g. tin tetrachloride and 250 g. purified liquid bromine. Moderate agitation brings about homogenization and the mixture is allowed to rest for 24 hours, in the course of which there is observed formation of a slight turbidity in the liquid.

The treated product is then rectified continuously at atmospheric pressure using a packed column provided with a device which protects the trichlorosilane against moisture.

Determination made on 100 cc. distillate did not reveal the slightest trace of phosphorous in the rectified product (content lower than $5.10^{-5}$ g./litre).

The liquid is then subjected to the action of a large excess of triphenylmethyl chloride, according to a known process, and is then again rectified, thereby eliminating the small quantities of tin salt which may have passed in the course of the first rectification, as well as the traces of boron, aluminum, gallium, indium, thallium, vanadium, titanium, and antimony which the liquid may have contained initially.

The term "halogenated" derivatives or compounds as used in the instant specification, and in the appended claims, comprises both halides and hydrohalides of the elements under consideration.

The expressions "addition compound" and "complex," as employed in the foregoing specification and in the appended claims, are used synonymously.

We claim:

1. Process for removing phosphorous-containing impurities from volatile liquid halogenated compounds of semi-conductor elements belonging to Group IV of the Periodic System, comprising the steps of: contacting the halogenated compound to be purified with a halogen selected from the group consisting of chlorine and bromine and with an excess of a reagent selected from the class of compounds consisting of titanium tetrahalide and tin tetrahalide, to thereby form a solid non-volatile addition compound containing phosphorous, and thereafter recovering the liquid halogenated compound of the semi-conductor element from the formed addition compound and the excess reagent.

2. Process for removing phosphorous-containing impurities from liquid halogenated compounds of semi-conductor elements belonging to the group consisting of silicon and germanium, comprising the following steps: contacting the halogenated compound to be purified with a halogen selected from the group consisting of chlorine and bromine and an excess of a reagent selected from the group consisting of titanium tetrahalide and tin tetrahalide, to thereby form a solid, non-volatile complex containing phosphorous, and thereafter separating the liquid halogenated compound of the semi-conductor element from the formed solid complex and the excess reagent.

3. Process according to claim 2 wherein the halogen added is chlorine used in a quantity ranging between 1 and 1000 times the theoretical quantity required for completely oxidizing the phosphorous contained in the liquid to be treated.

4. Process according to claim 2 wherein the halogen added is bromine used in a quantity ranging between 1 and 1000 times the theoretical quantity required for completely oxidizing the phosphorous contained in the liquid to be treated.

5. Process according to claim 2 wherein the tetrahalide complexant is used in a quantity ranging between 10 and 1000 times the quantity theoretically required to form the complex $MCl_4 \cdot PX_5$, where M designates one of the elements selected from the group consisting of Ti and Sn, and X designates one of the halogens selected from the group consisting of Cl and Br.

6. Process according to claim 2 wherein the reagents are mixed at room temperature, and are then permitted to rest for a period between 2 and 24 hours before separating the formed complex.

7. Process according to claim 2 wherein the separation of the liquid halogenated compound is carried out by distillation.

8. Process according to claim 7 wherein the separated, distilled liquid halogenated compound is treated with triphenylmethyl chloride to thereby eliminate entrained excess reagent.

9. Process in accordance with claim 2 wherein said non-volatile complex containing phosphorous comprises the formula $MCl_4 \cdot PX_5$, where M is selected from the group consisting of Ti and Sn and X designates halogens selected from the group consisting of Cl and Br, the total number of halogen atoms amounting to 5 and wherein said tetrahalide reagent is used in a quantity ranging between 10 and 1,000 times the quantity theoretically required to form said complex $MCl_4 \cdot PX_5$.

References Cited by the Examiner
UNITED STATES PATENTS
2,821,460    1/58    Whelan _____ 23—205 X

OTHER REFERENCES
Mellor: "Comprehensive Treatise on Inorganic and theoretical Chemistry," 1927, vol. VII, pages 79, 85, 437, 446.

Van Wazer: "Phosphorus and Its Compounds," 1958, vol. I, pages 221, 237, 241.

MAURICE A. BRINDISI, *Primary Examiner.*